United States Patent Office 2,926,023
Patented Feb. 23, 1960

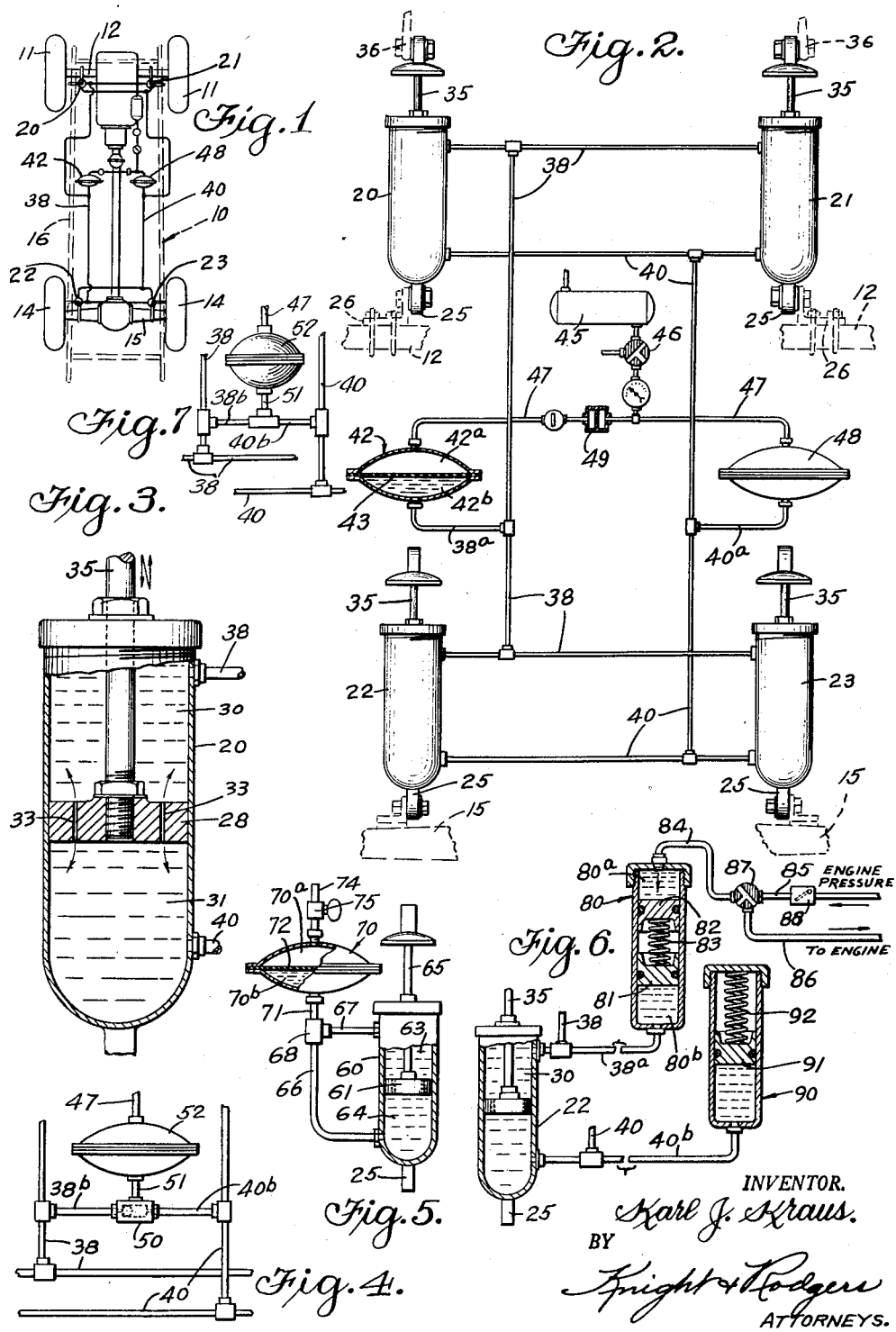

2,926,023

SHOCK ABSORBER AND STABILIZING SYSTEM FOR A VEHICLE

Karl J. Kraus, Las Vegas, Nev., assignor of one-third to John K. Lyon, Pasadena, Calif.

Application October 19, 1953, Serial No. 386,777

8 Claims. (Cl. 280—124)

The present invention relates generally to vehicles and more especially to a fluid-type shock absorber and stabilizing system for vehicles. Since the invention has been particularly designed and developed with reference to automobiles, it is described in a form suited to attachment to the ordinary automobile; where it will be realized that in its broader aspects, the invention is not necessarily limited to any particular type of vehicle.

Motor vehicles are provided with springs between the body and the wheels in order to make the vehicles ride more easily by absorbing the shock imparted to the body by unevenness in the roadway. These springs allow relative movement between the wheels and the remainder of the unsprung mass of the vehicle on the one hand and the body and the remainder of the sprung mass of the vehicle on the other hand.

If the springs are made relatively stiff and unyielding, the characteristics of the ride produced may be described as "hard." The springs then transmit to the body and people riding in it the shock from all but small inequalities in the road surface and so stiff springs are comfortable only when the road is comparatively smooth. If the springs are made comparatively flexible or yielding, the ride may be described as "soft" or "easy." In this case there is more relative movement between the wheels and the body so that the amount of shock transmitted to the body is substantially decreased and a greater degree of riding comfort is obtained. However, this comfort is secured at the expense of incurring other disadvantages. The flexible nature of the springs reduces the control that they exert over the position of the body on the frame and allows the body to sway sideways when turning corners, especially sharp corners. Likewise the body dips down in front when the brakes are suddenly applied. This excessive swaying movement of the body with respect to the wheels and frame of the vehicle is very dangerous since it may produce skidding and loss of control of the vehicle by the driver.

Shock absorbers have been added to the springs to modify the spring action, particularly at the extreme range of movement, in an effort to retain the advantages of flexible springs and to eliminate their disadvantages. However, shock absorbers, like springs, operate at their best over only a narrow range of conditions. They represent a compromise between conflicting design requirements. They can be engineered to meet satisfactorily any given set of conditions, for example roughness of road, vehicle loading, and the like; but in their usual design they do not have sufficient flexibility of action to successfully meet all conditions which may be encountered by the ordinary motor vehicle.

Various attempts have been made to provide shock absorbers or stabilizing systems which are adjustable in order to increase the range of satisfactory operation and effect a further increase in the degree of control which they exercise over body movement without in turn making the riding qualities of the vehicle too uncomfortable. Such designs have involved a number of parts and have the very marked disadvantages that they are expensive to manufacture and maintain, they are subject to wear which reduces their useful life, and they are not sufficiently reliable in operation to compensate for their disadvantages.

Accordingly it is the general object of my invention to provide a shock absorber and a stabilizing system which, when combined with conventional types of spring suspensions, exercises a superior degree of control over movements of a vehicle body, especially when the vehicle is moving at high speeds over rough roads or making sharp turns.

It is a further object of my invention to provide a shock absorber and stabilizing system for motor vehicles which is adjustable, at least to some extent, in order to afford the best riding characteristics of the system when the vehicle is traveling over smooth roads or at low speeds but which can produce a greater degree of control over movements of the vehicle body when such is required.

A further object of my invention is to provide a shock absorber and stabilizing system for a motor vehicle which is simple in construction and reliable in operation and is also flexible in its design and organization of parts so that it may be readily adapted to different types of vehicles and different operating conditions.

These and other advantages have been attained in a fluid type shock absorber and stabilizing system constructed according to my invention by providing one or more cylinders each having a piston reciprocable within the cylinder and dividing the interior of the cylinder into two separate chambers which are filled with liquid. The system also includes one or more accumulators which are divided into two compartments, one of which is filled with liquid from the stabilizing system and the other of which has fluid under pressure, preferably superatmospheric. The first mentioned compartment is of variable volume to receive excess liquid from one or more of the cylinders. It is preferable to connect to the second compartment of the accumulator means for supplying elastic fluid under pressure in order that the pressure within the system may be varied at the will of the vehicle operator to meet changing operating conditions.

In a preferred embodiment, the bodies of the cylinders are connected to the unsprung mass of the vehicle. The pistons each have a piston rod extending through the upper end of the cylinder and connected in turn at its upper end to the sprung mass of the vehicle. As a result, the underside of the piston has a greater net area exposed to liquid pressure and so there is a resultant upward force which assists in supporting the sprung mass of the vehicle. As the piston reciprocates within the cylinder, the volume of the piston rod within the cylinder increases and decreases and a corresponding volume of liquid is discharged from or returned to the cylinder, it being a function of the accumulator to provide a variable volume chamber for this purpose. Both chambers of the cylinder and one compartment of the accumulator are at all times filled with liquid which is physically separated from the air or other fluid in the accumulator which applies pressure to the system. This insures that the liquid in the cylinders at all times is free from air and retains its uniform characteristics.

How the above and other objects and advantages of my invention, as well as others not specifically referred to herein, are attained will be more readily understood by reference to the following description and to the annexed drawings, in which:

Fig. 1 is a diagrammatic plan view of the chassis of an automotive vehicle showing the application thereto of a preferred embodiment of my improved shock absorber and stabilizing system;

Fig. 2 is a diagrammatic view at a larger scale showing a preferred form of my invention;

Fig. 3 is a vertical median section through one of the cylinders;

Fig. 4 is a fragmentary diagrammatic view similar to Fig. 2 illustrating a modified form of my invention with a single accumulator;

Fig. 5 is a diagrammatic view showing another modified form of my invention with a single cylinder;

Fig. 6 is a fragmentary diagrammatic view illustrating another modified form of my invention with a variational means for pressurizing the system; and Fig. 7 is a view similar to Fig. 4 but without a check valve.

Referring now to the drawings, there is shown in Fig. 1 in diagrammatic form the chassis 10 of an automobile of conventional construction. Front wheels 11 are interconnected by an axle 12 and rear wheels 14 are interconnected by an axle 15. By a means of springs (not shown) of any suitable type, the axles are connected in a conventional manner to the frame indicated generally at 16 and upon which the body of the vehicle is mounted. The wheels and their interconnecting axles, together with a certain proportion of the springs and other elements which connect them to the frame, are generally referred to as the unsprung weight or mass of the vehicle. The frame 16 and the body or other parts mounted thereon, being supported upon the axles by springs, are referred to as the sprung weight or mass of the vehicles. The parts so far mentioned are conventional in their construction and since my invention may be applied to any type of vehicle, these parts are shown only diagrammatically and not in detail.

A preferred form of my shock absorber and stabilizing system is illustrated in Figs. 2 and 3. The system includes four cylinders 20, 21, 22 and 23 which are all exactly alike so that only one is described in detail. Cylinder 20 is shown in section in Fig. 3. In an ordinary installation, the four cylinders are mounted at four separate points on the vehicle chassis, normally at points near the vehicle wheels. Thus cylinders 20 and 21 are typically connected to front axle 12 of the vehicle while cylinders 22 and 23 adjacent rear wheels 14 are connected to rear axle 15 of the vehicle. For purposes of attaching the cylinders to the axles, which are part of the unsprung weight of the vehicle, each cylinder may be provided with a lug 25 to which is connected a bracket 26.

As illustrated by the typical cylinder shown in Fig. 3, each cylinder is provided internally with piston 28 which is reciprocable within the cylinder and which divides the space within the cylinder into an upper chamber 30 and a lower chamber 31. Each piston 28 is provided with one or more ports 33 which extend through the piston to provide communication between chambers 30 and 31 so that liquid may be transferred between the two chambers at a restricted rate, as will be more fully described. Ports 33 are a preferred form of passage means extending between the two chambers of each cylinder for such transfer of liquid; but it will be realized that other types of passage means may be used if desired. For example, the piston may have a sufficiently loose fit inside the walls of cylinder 20 that leakage of fluid past the piston is sufficient for this purpose.

Each piston 28 has attached to it a piston rod 35 which extends outwardly through the top of the cylinder and is connected by bracket means indicated generally at 36 to vehicle frame 16 or some other suitable portion of the sprung mass of the vehicle. For reasons which will become apparent, it is preferred that piston rods 35 extend out through the upper end of the cylinder as shown in Fig. 3; but it is also possible to invert each of the cylinders, without other change in the structure, so that the piston rods extend outwardly of the cylinders at the bottom end and are connected to the vehicle axle or other parts of the unsprung mass of the vehicle.

In this type of shock absorbing and stabilizing system, both chambers 30 and 31 in each cylinder are completely filled with a suitable incompressible fluid, normally a light weight petroleum oil of the type conventionally used in hydraulic shock absorbers or hydraulic brake systems. Suitable conduit means interconnects all the upper chambers of the four cylinders for free flow of liquid between these chambers; and other similar conduit means interconnects all the lower chambers of the four cylinders for free flow of liquid between the chambers. The conduit means interconnecting the upper chambers is indicated generally at 38. In the arrangement shown, conduit means 38 includes a cross connection between cylinders 20 and 21, a second cross connection between rear cylinders 22 and 23, and another line extending between these two cross connections. A separate but similar conduit means 40 interconnects all the lower chambers 31.

Accumulator 42 is connected to conduit means 38 as shown in Fig. 2. Accumulator 42 is here shown as being of the diaphragm type. The accumulator is a hollow pressure vessel made in two halves which clamp between them the peripheral margin of a flexible diaphragm 43 of rubber or similar material which divides the interior of the accumulator into two compartments 42a and 42b. Conduit means 38 is connected by branch line 38a to compartment 42b, which is the lower one. This compartment is of variable volume because of the elastic nature of the diaphragm. Compartment 42b is completely filled with liquid and is in free communication with all chambers 30 of the cylinders through the interconnecting conduit means 38.

The other compartment 42a of the accumulator is filled with air; and in this preferred form of the invention means is provided for changing the air pressure in this compartment. This means includes a reservoir tank 45, which serves as a source of compressed air under relatively high pressure, and is connected through three-way valve 46 and conduit 47 with compartment 42a of the accumulator.

The complete shock absorber and stabilizing system also preferably includes a second accumulator 48 constructed in the same manner as accumulator 42. This accumulator is connected at one side by branch line 40a with conduit means 40 so that one of its internal compartments is likewise filled with liquid and is in free communication with lower chambers 31 of all the cylinders. The other interior compartment of the second accumulator is similarly connected to conduit 47 and by the conduit through valve 46 to reservoir tank 45 so that air pressure is applied to the upper side of the two diaphragms 43 to exert pressure upon the liquid in the lower compartments of the accumulators. With this arrangement, conduit 47 interconnects both air compartments 42a and equal air pressure is applied simultaneously and at all times upon both accumulators. Conduit 47 preferably includes orifice plate 49 which allows air pressures in the two accumulators to equalize but resists any sudden transfer of a large volume of air from one accumulator to the other.

Valve 46 is placed between air source 45 and the accumulators. It is a three position valve of any suitable means. In one position, air is admitted to the accumulators from tank 45 to build up the air pressure in them while in another position the valve connects the accumulators to the atmosphere in order to exhaust air from the accumulators and reduce the air pressure in them. In the closed position, a given air pressure is maintained within the accumulators. In this way the pressure within the accumulators can be adjusted to any desired value and then maintained for as long as desired.

If the accumulators are charged with air to some predetermined pressure, the system when under static conditions will come to rest with the same load on each piston 28. The air pressure in the two accumulators is the same, exerting the same pressure on the two accumulator diaphragms. Since the opposite sides of each piston 28 are in communication with each other through ports 33, the liquid pressure above and below the piston is the same, as is the liquid pressure in each of the four cylinders. Consequently, the loading on all four pistons is equal.

The area on the under side of each piston 28 exposed to liquid pressure is greater than the area on the upper side by an amount equal to the cross sectional area of piston rod 35. Therefore, the net upward force applied to the piston by the liquid is greater than the net downward force by an amount equal to the area of the piston rod multiplied by the unit pressure of the liquid in the cylinder. This resultant force is exerted upwardly on each piston rod 35 and supports a portion of the unsprung mass of the vehicle. The remainder of the unsprung mass is, of course, supported mechanically in the usual manner by the vehicle springs.

Assume now that the downward load applied to a piston rod 35 and piston 28 is increased very rapidly. This is comparable to the condition that occurs when a vehicle traveling along a road hits a bump and a wheel rises relative to the frame. The piston immediately tends to move downward toward the bottom of the cylinder. Such movement of the piston requires displacement of liquid from chambers 31. If there were no conduit 40 by which the liquid in chamber 31 could leave the cylinder, all the displaced liquid would necessarily pass upward through ports 33. A very rapid or instantaneous load change on the piston would require movement of liquid at extremely high velocity through ports 33 and there would be, to permit the piston to descend rapidly in response to the increased loading. Accordingly, a very large pressure drop occurs between the two sides of the piston. This condition would also produce a very high pressure in chamber 31.

However, this movement of the liquid is modified by the connection of chamber 31 to an accumulator which acts as a receiver of variable volume to receive and hold temporarily liquid displaced from the cylinder. Because of the presence of the accumulator 48 connected to lower chamber 31, displacement of fluid from chamber 31 is more rapid because, although some liquid still passes through ports 33, a portion of it is forced by the increased pressure through conduit 40 into the accumulator. The more rapid displacement of a given volume of fluid with a given area of ports 33 that is made possible by adding the accumulator allows more rapid downward movement of the piston in the cylinder and also reduces the maximum pressure reached in the liquid beneath the piston. As compared to the same system without an accumulator, the resistance to downward movement of the piston is softer and more yielding instead of being hard and positive because of the incompressible nature of the fluid in chamber 31. However, there are other factors which also influence the net reaction to downward movement of the piston, such as the gross area of ports 33 and the viscosity of the liquid in the cylinder. Obviously, an increase in the gross area of ports 33 or a decrease in the viscosity of the liquid makes transfer of liquid from the lower chamber 31 to the upper chamber 30 more rapid for a given pressure drop across the piston; or, in other words, either or both of these changes decreases the resistance offered to a given force moving the piston downwardly in the cylinder.

It should be noted that as piston 28 moves downwardly, the total volume of piston rod 35 in upper chamber 30 increases so that an equal volume of the fluid must be displaced out of the cylinder to allow the piston to move down in the cylinder. This displaced liquid passes through conduit 38 or 40 to an accumulator.

Piston 28 may descend at a rate such that the volume of chamber 30 increases faster than it can be filled by fluid flowing through passage means 33. In this case liquid enters chamber 30 through line 38 from accumulator 42. Liquid flow into the cylinder is expedited by the air pressure applied to diaphragm 43 of accumulator 42 since this pressure is always tending to reduce the volume of chamber 42b and exhaust liquid into the cylinder. The air pressure assists liquid to flow into cylinder chamber 30 fast enough that the liquid follows the descending piston always in contact with the piston, and so the phenomenon of cavitation is avoided when the piston moves rapidly. The superatmospheric pressure applied to the liquid in chamber 42b by the flexible diaphragm and the air body above it, prevents the occurrence of negative or subatmospheric pressures in the upper cylinder chamber.

After the piston reaches the end of its downward travel, the forces acting upon it are in a direction to restore it to its initial position of equilibrium. The vehicle springs have been compressed and now exert an upward pull on piston rod 35 so that piston 28 is moved up within the cylinder. This upward movement of the piston causes displacement of fluid from chamber 30 either into chamber 31 through ports 33 or out through line 38, the general result being liquid flow in reverse directions to that just described. The upward movement of the piston reduces the pressure on the fluid in chamber 31 and increases it in chamber 30; and as a result the fluid displaced through conduit 40 into accumulator 48 now flows in a reverse direction, assisted by the pressure on top of diaphragm 43 in the accumulator, back into chamber 31.

When fluid is forced out of a cylinder into a lower compartment of an accumulator, the volume of the liquid filled compartment increases because of the deformation of diaphragm 43 forming one wall of the compartment. The elastic diaphragm tends to return to its normal position and this exerts a pressure on the liquid that is in a direction to return it to the cylinder. The air pressure in the upper accumulator compartment is operative in the same direction. As piston 38 rises on the rebound in the assumed case being considered, the pressure on the liquid from both the diaphragm and air in accumulator 48 causes the liquid to flow into the lower cylinder chamber fast enough to insure that the chamber is always full. Thus liquid follows also the rising piston and cavitation is avoided even when piston speeds are relatively rapid. For this reason it is advantageous to increase the air pressure in the accumulators when the vehicle is moving at high speeds since shocks are then greater and piston movements more rapid.

The exact fluid movement for any change in position of piston 28 is determined by a number of factors, but the chief ones of concern are the speed of movement of the piston and the size of ports 33. If the piston moves comparatively slowly or the ports are comparatively large, then fluid flow through the ports may be sufficiently fast that fluid can be displaced between the two cylinder chambers at approximately the rate required to compensate for piston movement. Under these circumstances there may be comparatively little liquid flow in either conduit 38 or 40 in addition to the flow caused by displacement of fluid from the cylinder by increased volume of the piston rod within the cylinder. On the other hand if the piston moves comparatively rapidly or the ports are comparatively small, or both conditions exist, then a correspondingly larger amount of fluid is displaced out of one of the cylinder chambers and there is greater liquid flow within conduits 38 and 40.

From this discussion it will be seen that accumulators 42 and 48 serve two basic purposes. In the first place they are variable volume receivers to receive excess fluid from the cylinders. This may be the fluid which is displaced from the cylinder because of the larger volume of piston rod 35 introduced into the cylinder as the piston descends or it may be fluid displaced from either one of the chambers because of the rapidity of movement of the piston. The second function of the accumulators is to act as a means for accumulating or storing energy. The general purpose of a shock absorber is to dissipate the kinetic energy of movement of the sprung mass of the vehicle, and the accumulators assist in this objective by storing momentarily a portion of the energy. It is stored in the form of an increase in pressure of the elastic fluid within the upper accumulator compartments and in deformation of the diaphragms; and is in proportion to the amount of liquid displaced into the accumulators. This energy is then returned to the system when the displaced fluid is forced out of the accumulators and back in the cylinders.

A third, but more incidental, purpose is served by the accumulators. That is to compensate for the change in volume of liquid that may result from temperature variations or from loss of liquid by leakage around piston rod seals, or elsewhere.

It will be noticed that in the system the gaseous and liquid phases are separated by the elastic diaphragms and do not come into contact with each other. Complete isolation of the liquid phase prevents formation of an oil-air emulsion at points of turbulent flow, as around the ends of ports 33. Emulsification of the oil is to be carefully avoided as it forms a spongy body and partly destroys the incompressible character of the liquid. A system in which emulsification can occur becomes variable and unpredictable in operation and so loses much of its value.

The operation of the one cylinder described is typical of all cylinders. It is of course possible that the operation of any one cylinder may be changed to some extent by what occurs in other cylinders. An example of this is where the piston in cylinder 22 moves downwardly and the piston in cylinder 23 moves upwardly at the same rate and for the same distance. In this case there may be basically a transfer of fluid between two cylinders with very little volume of fluid reaching either of the accumulators.

An automotive vehicle is preferably provided with four cylinders as described because the most advantageous stabilizing results are obtained. When rounding a sharp corner, the two pistons at one side of the car, for example in cylinders 21 and 23 move downwardly while the pistons at the opposite sides of the vehicle, in cylinders 20 and 22, move upwardly. When the vehicle is rapidly accelerated or decelerated the pistons in the two rear cylinders or in the two front cylinders, respectively, tend to move downwardly with upward movement of the pistons in the cylinders at the other end of the car. On a rough road the motion of any piston can be independent of any other piston, thus giving the maximum amount of shock absorbing characteristics to the movement of any one wheel. However, it will be understood that the system as described may be reduced in extent by using only two cylinders, for example cylinders 22 and 23 at the rear of the vehicle. In this case the system is the same as shown in Fig. 2 except that cylinders 21 and 20 are omitted along with so much of conduit means 38 and 40 as lies forwardly of branch connections 38a and 40a to the accumulators. Likewise two cylinders may be applied to the front only of the vehicle.

A possible variation of my improved shock absorbing and stabilizing system using a single accumulator is illustrated in Fig. 4 in which the system is the same as in Fig. 2 except as will be pointed out. Conduits 38 and 40 are connected to the four cylinders, but branch lines 38b and 40b from the conduits 38 and 40 are both connected to a two way check valve 50. The check valve is then connected by conduit 51 to a single accumulator 52 which has the same construction as accumulator 42 described above. Conduit 51 is connected to the lower compartment which is filled with liquid while the other compartment of the accumulator, which is filled with air, is connected as before by conduit 47 to a source of air under pressure.

With this system the operation is basically the same as already described except that only the upper chambers 30 or the lower chambers 31 of the cylinders are connected at any time to the accumulator. For example if the downward movement of one or more pistons 28 causes the pressure in conduit 40 to exceed that in conduit 38, then check valve 50 closes off communications of conduit 38 and establishes communication between conduit 40 and one side of the accumulator. Communication between the accumulator and the other cylinder chambers is established when the pressure in conduit 38 exceeds that in conduit 40. The presence of but a single accumulator requires the transfer of liquid through cylinder ports 33 at a somewhat greater rate than in the form first described, and accordingly the ports may be made slightly larger to avoid an unduly "hard" ride.

Another modified form of my invention illustrated in Fig. 7 is possible by making a slight simplification of the system shown in Fig. 4. It may be desired to omit check valve 50, leaving conduit 51 at all times in communication with both branch lines 38b and 40b. Thus the lower or liquid filled chamber of the accumulator is at all times in communication with the four cylinders. Since the principal effect of check valve 50 is to eliminate a direct connection between conduit means 38 and conduit means 40, the removal of that valve as in the embodiment of Fig. 7 places all chambers 30 of the four cylinders in communication with all chambers 31 through the interconnecting conduit means. When only a single accumulator is used as in Fig. 7, the elimination of check valve 50 has the advantage that pressures throughout the entire system tend to equalize and the high pressure in the air chamber of the accumulator is effective at all times to force fluid to follow the piston closely during its movements in either direction.

As another modified form of my invention, there is shown in Fig. 5 a further simplified system consisting of only one cylinder and one accumulator. This system is illustrative of an independent system for each wheel of a vehicle. It is essentially the same as the system previously described if the conduit means between cylinders is eliminated.

The system of Fig. 5 includes a single cylinder 60 having within it a reciprocable piston 61 which divides the interior of the cylinder into upper and lower chambers 63 and 64 respectively. Piston 61 is fastened to the lower end of connecting rod 65 which passes out of the cylinder through the upper end thereof where it may be connected to a bracket such as bracket 36 for attachment to the sprung mass of the vehicle. The lower end of the cylinder is again preferably provided with a lug 25 as a part of the means for connecting the cylinder to the unsprung mass of the vehicle.

Conduit means 66 is connected to lower cylinder chamber 64 while conduit means 67 is connected to the upper cylinder space 63. These two conduits are connected to each other at a T-connection 68, thus providing passage means interconnecting the chambers at the two sides of piston 61 for a transfer of fluid between the chambers. Accumulator 70 is of the type previously described and is connected to the conduits at T 68 through conduit 71. The interior of the accumulator is divided into two compartments by elastic diaphragm 72, the lower compartment 70b being filled with liquid and in communication with conduit 71. The upper chamber 70a is filled with air or other elastic fluid under pressure. A pipe 74 with valve 75 is provided for filling the upper chamber with air to the desired pressure. When valve 75 is closed, the air pressure inside of the accumulator compartment is maintained at a relatively constant value, although the pressure fluctuates in normal usage as the position of diaphragm 72 changes when system is in operation.

Here again, the upper and lower chambers of the cylinders are in communication with each other and a single accumulator not only provides a single variable volume chamber to receive excess fluid from the cylinder but also the means for applying a superatmospheric pressure to the entire fluid system.

Another modified form of my invention is illustrated in Fig. 6 wherein is illustrated a different type of accumulator and different means for supplying superatmospheric pressure to the fluid system. Although only a single cylinder 22 is shown, it will be understood that the remainder of the complete system preferably includes four cylinders 20, 21, 22 and 23 as illustrated in Fig. 2, subject to the possibility of making the various modifications as described.

In this form of the invention, the accumulator 80 consists of a cylinder within which are two pistons 81 and 82. A compression spring 83 is confined between the two pistons and bears at its ends against the inner opposed faces of these pistons. The compartment 80b in the cylinder between piston 81 and the adjacent end of the cylinder is connected by branch conduit 38a with conduit means 38. This space 80b is filled with liquid under pressure and is in communication with the upper cylinder spaces 30. At the other end of cylinder 80 is a similar compartment 80a between the end wall of the cylinder and piston 82. This latter compartment is connected by conduit 84 and delivery line 85 with the usual oil pump of the engine (not shown) of an automobile so that the full pressure which the pump is capable of delivering can be delivered into the accumulator space 80a. This delivery line from the oil pump may contain a check valve 88. Also communicating with conduit 84 is a discharge line 86. It is connected to the delivery line through a three-way manually controlled valve 87 in the line. Valve 87 in one position connects the engine pump to accumulator space 80a to admit oil and increase pressure in chamber 80a. This pressure is in turn exerted on the liquid in cylinder 22 through piston 81. In an alternate position valve 87 connects the accumulator space 80a to return line 86 and allows oil to be returned through line 86 to the engine for the purpose of reducing the pressure in cylinder space 80a. In a third position, the valve is closed and shuts off the accumulator from the engine to maintain a given pressure in the accumulator.

This variational form includes a second accumulator 90. Although the second accumulator may be of the same construction as accumulator 80, I have shown a simplified form having a cylinder within which is a single piston 91. The compartment 90a forward of the piston is in communication with conduit means 40 through branch line 40b. At the other or rear side of the piston is compression spring 92 which bears against the piston and against the closed end of the cylinder.

Increased pressure upon the liquid within cylinders 20, 21, 22 and 23 is obtained by admitting oil under pressure from the engine through line 84 into accumulator compartment 80a. This causes cylinder 82 to move away from the end of the accumulator, compressing spring 83. The reaction to this compression of the spring applies pressure to the liquid in the accumulator compartment 80b. Since all parts of the system are in communication with each other, pressure equalizes throughout the system under static conditions. This will be reflected by movement of accumulator piston 91 and compression of spring 92. In the accumulators of this design, springs 83 and 92 provide the elasticity found in diaphragm 43 which permits the receiver compartments to change in volume as required to receive liquid from one of cylinders 20, 21, 22, or 23 at the vehicle wheels or to force liquid into these same cylinders for reasons described above.

From the foregoing description it will be seen that various changes in the design or arrangement of the several elements composing my improved shock absorber and stabilizing system may be made without departing from the spirit and scope of my invention. Each of the several forms described above possesses advantages which best adapt it to certain specific conditions but the basic principles of operation are retained in all forms. Accordingly, it is to be understood that the above description is considered as being illustrative of, rather than limitative upon, the appended claims.

I claim:

1. In a fluid-type shock absorber and stabilizing system for a vehicle having sprung and unsprung masses, the combination comprising: a plurality of cylinders each provided with a piston reciprocable within the cylinder and dividing the interior of the cylinder into an upper chamber and a lower chamber, said chambers being filled with liquid; passage means extending between the two chambers of each cylinder for transfer of liquid between the two chambers at a restricted rate; means connecting the cylinders to one of said masses and the pistons to the other of said masses; an accumulator; a first conduit means interconnecting all the upper cylinder chambers and the accumulator for free flow of liquid therebetween; a second conduit means interconnecting all the lower cylinder chambers and the accumulator for free flow of liquid therebetween; and means for exerting pressure upon the liquid in the accumulator to regulate liquid pressure in the cylinders.

2. In a fluid-type shock absorber and stabilizing system for a vehicle having sprung and unsprung masses, the combination comprising: a plurality of cylinders each provided with a piston reciprocable within the cylinder and dividing the interior of the cylinder into an upper chamber and a lower chamber, said chambers being filled with liquid; passage means extending between the two chambers of each cylinder for transfer of liquid between the two chambers at a restricted rate; means connecting the cylinders to one of said masses and the pistons to the other of said masses; an accumulator; conduit means interconnecting all the upper chambers and the accumulator for free flow of liquid therebetween; a second accumulator; conduit means interconnecting all the lower chambers and the second accumulator for free flow of liquid therebetween; and means for exerting pressure upon the liquid in both accumulators to regulate liquid pressure in the system.

3. A shock absorber and stabilizing system as in claim 2 in which each accumulator includes means dividing the accumulator into two compartments to one of which said conduit means is connected; and the means for exerting pressure on both accumulators includes a source of air under pressure and means connecting said source to both the other compartments of the accumulators.

4. A shock absorber and stabilizing system as in claim 2 in which each piston has a port through it to transfer liquid between chambers of a cylinder.

5. A shock absorber and stabilizing system as in claim 2 in which each cylinder has a piston rod connected to the piston inside the cylinder and extending outwardly through the top of the cylinder to connect with one of the masses of the vehicle.

6. In a fluid-type shock absorber and stabilizing system for a vehicle having sprung and unsprung masses, the combination comprising: a plurality of cylinders each provided with a piston reciprocable within the cylinder and dividing the interior of the cylinder into an upper chamber and a lower chamber, said chambers being filled with liquid; passage means extending between the two chambers of each cylinder for transfer of liquid between the two chambers at a restricted rate; means connecting the cylinders to one of said masses and the pistons to the other of said masses; an accumulator; conduit means interconnecting all the upper cylinder chambers and the accumulator for free flow of liquid therebetween; a second accumulator; conduit means interconnecting all the lower cylinder chambers and the second accumulator for free flow of liquid therebetween; means for applying pressure directly to the liquid in at least one of said accumulators; and means for adjusting the pressure so applied.

7. In a fluid-type shock absorber and stabilizing system for a vehicle having sprung and unsprung masses, the combination comprising: a plurality of cylinders each provided with a piston reciprocable within the cylinder and dividing the interior of the cylinder into an upper chamber and a lower chamber, said chambers being filled with liquid; passage means extending between the two chambers of each cylinder for transfer of liquid between the two chambers at a restricted rate; means connecting the cylinders to one of said masses and the pistons to the other of said masses; an accumulator; conduit means interconnecting all the upper cylinder chambers and the accumulator for free flow of liquid therebetween; a second accumulator conduit means interconnecting all the lower cylinder chambers and the second accumulator for free flow of liquid therebetween; a spring loaded piston in each one of the accumulators applying pressure to the liquid in the accumulator; and means for exerting hydraulic pressure on at least one of the springs to adjust the liquid pressure in the system.

8. In a fluid-type shock absorber and stabilizing system for a vehicle having sprung and unsprung masses, the combination comprising: a plurality of cylinders each provided with a piston reciprocable within the cylinder and dividing the interior of the cylinder into an upper chamber and a lower chamber, said chambers being filled with liquid; passage means extending between the two chambers of each cylinder for transfer of liquid between the two chambers at a restricted rate; means connecting the cylinders to one of said masses and the pistons to the other of said masses; first conduit means interconnecting all the upper cylinder chambers for free flow of liquid therebetween; second conduit means interconnecting all the lower cylinder chambers for free flow of liquid therebetween; and a single accumulator connected to both of said conduit means to receive liquid from both said conduit means.

References Cited in the file of this patent

UNITED STATES PATENTS

| Number | Name | Date |
|---|---|---|
| 864,141 | Scott | Aug. 20, 1907 |
| 1,861,821 | Schaum | June 7, 1932 |
| 1,936,788 | Hardy | Nov. 28, 1933 |
| 1,945,499 | Flarsheim | Jan. 30, 1934 |
| 1,953,128 | Peteler | Apr. 3, 1934 |
| 2,038,032 | Flynn | Apr. 21, 1936 |
| 2,201,912 | Morgan | May 21, 1940 |
| 2,452,105 | Cosentino | Oct. 26, 1948 |
| 2,481,150 | Pifer | Sept. 6, 1949 |
| 2,571,279 | Myklestad | Oct. 16, 1951 |
| 2,628,692 | Hufferd | Feb. 17, 1953 |

FOREIGN PATENTS

| Number | Country | Date |
|---|---|---|
| 363,811 | Great Britain | Dec. 31, 1931 |
| 518,848 | Great Britain | Mar. 8, 1940 |
| 632,497 | Great Britain | Nov. 28, 1949 |
| 330,946 | Italy | Oct. 26, 1935 |